United States Patent [19]
Nakayama et al.

[11] 3,716,742
[45] Feb. 13, 1973

[54] DISPLAY DEVICE UTILIZATION GAS DISCHARGE

[75] Inventors: Norihiko Nakayama, Kobe; Mitsuoki Osawa, 641-1-1, Okubomachi, Okubo-cho, Akashi-shi, both of Japan

[73] Assignee: Fujitsu Limited, Kawasaki, Japan

[22] Filed: March 2, 1971

[21] Appl. No.: 120,284

[30] Foreign Application Priority Data

March 3, 1970 Japan ................................. 45/18213
Dec. 29, 1970 Japan .............................. 45/128634

[52] U.S. Cl. ................. 313/182, 313/188, 313/207, 313/210, 315/169
[51] Int. Cl. .......................................... H01j 61/36
[58] Field of Search...313/109.5, 182, 188, 207, 210; 315/169 R, 169

[56] References Cited

UNITED STATES PATENTS

| | | | |
|---|---|---|---|
| 3,513,327 | 5/1970 | Johnson | 315/169 R |
| 3,614,509 | 10/1971 | Willson | 315/169 R |
| 3,617,803 | 11/1971 | Wheeler | 313/207 |
| 3,499,167 | 3/1970 | Baker et al. | 313/188 X |
| 3,614,511 | 10/1971 | Baker | 313/188 |

*Primary Examiner*—Herman Karl Saalbach
*Assistant Examiner*—Saxfield Chatmon, Jr.
*Attorney*—Curt M. Avery, Arthur E. Wilfond, Herbert L. Lerner and Daniel J. Tick

[57] ABSTRACT

A pair of insulating substrates are positioned in spaced parallel relation having inside surfaces opposite each other with a gap filled with gas capable of ionization. A first group of electrodes are positioned on the inside surfaces of one of the substrates, and a second group of electrodes are positioned on the inside surfaces of the other of the substrates. The first group of electrodes are positioned in rows and the second group of electrodes are positioned in columns, and the first and second groups of electrodes are transversely positioned relative to each other. The surfaces of the first and second groups of electrodes are covered with dielectric layers, and each of the dielectric layers is covered with a protective layer to protect the surfaces inside the display device from sputtering. Each cross point of an electrode of the first group and an electrode of the second group is a discharge point for display.

7 Claims, 8 Drawing Figures

3,716,742

DISPLAY DEVICE UTILIZATION GAS DISCHARGE

DESCRIPTION OF THE INVENTION

The invention relates to an improved display device utilizing gas discharge. More particularly, this invention relates to a novel display device utilizing gas discharge wherein gas discharge cells are provided with groups of electrodes which are transversely positioned relative to each other such as, for example, groups of row and column electrodes which are insulated from the cells in order to provide glow discharge points in a matrix arrangement. A protection layer is provided on the surface of the dielectric layer covering each said group of electrodes. The protection layer protects the surface from the influence of sputtering. A layer which increases the secondary emissivity $\gamma$ between that surface and the protection layer may be formed on the surface of the dielectric layer.

A display device of gas discharge in which gas discharge cells are arranged in panels, each cell being provided with transversely positioned groups of electrodes arranged in groups of rows and columns insulated from the cells in order to provide discharge points in a matrix structure is known. The basic idea of such a device is disclosed in, for example, an article by D.L. Bilzer et al. entitled "The Plasma Display Panel–A Digitally Addressable Display with Inherent Memory," IEEE Proceedings, Fall Joint Computer Conference, 1966, pages 541–547. Such ideas are much appreciated since the device functions not only for displaying informations, but also for storing or memorizing informations.

According to the basic idea described in the above-mentioned article, the display device is constructed of a first glass panel having many small holes on it, arranged in matrix configuration. Second and third glass panels are provided with a first group of electrodes in rows and a second group of electrodes in columns, respectively, transverse to each other on the surfaces of outside members and placed on both sides or surfaces of the first glass panel. The second and third panels function to support the groups of electrodes in rows and columns and to insulate said groups of electrodes from the small holes, which become discharge cells. Here, the second and the third glass panels are preferably thick with respect to mechanical strength, when they are used as means to support electrodes. If, however, they are of insulating material, the inner ones are more convenient for decreasing the driving voltage. Accordingly, in an actual gas discharge display device of this type, a pair of glass panels supporting groups of electrodes in rows and columns, the surfaces of which are covered with a thin dielectric layer, are placed opposite each other with gas discharge cells between them.

If, however, such a gas discharge display device is used for a long time, bright spots are produced in the cells in the course of discharge and the firing voltage shows a tendency to increase. Examination of such degenerated cells clearly indicates that some places on the internal surface of the cells has turned dark. Deposits of some lead (Pb) and bismuth (Bi) can be detected on the dark spots. The reason why the phenomenon of dark deterioration is caused has not yet become clear.

It can be guessed, however, that since low melting temperature glass material containing Pb is used as the dielectric layer forming the inside wall of cells, a compound of heavy metallic elements such as PbO, $Bi_2O_3$ in the glass material causes sputtering by ion bombardment in the course of discharge and with decomposition and dispersion, the compound adheres to the inside wall of the cell. In order to prevent dark deterioration, the use of low melting temperature glass may be stopped. However, nothing as suitable to the requirements of both manufacturing technology and electronic characteristics as that has been found yet.

On the other hand, the electronic characteristic of the aforedescribed type of display device utilizing gas discharge depends not only on the construction of cells or the pressure of the enclosed gas, but also on the material, that is, the dielectric layer comprising the inside wall of the cell. It is well known by Paschen's Curve that the value of the gap distance d of the discharging space of the cells, multiplied by the pressure $p$ of gas in the cells, decides the firing voltage $Vf$, which is required to be sufficient to start discharging. Besides this, the firing voltage $Vf$ is influenced by the secondary electron emissivity $\gamma$ of the cell surface. Accordingly, in order to decrease the firing voltage $Vf$, it is desirable to choose, as a dielectric material comprising the inside wall of the cells, a material whose $\gamma$ is large. However, as mentioned above, the demands of manufacturing technology, expansion coefficient, thermal flow properties, melting point, transparency, and other things define a material selection range. For this reason, it is impossible to try to decrease the firing voltage $Vf$ without utilizing low melting temperature glass.

An object of this invention is to provide a long-life display device which prevents sputtering due to ion bombardment.

Another object of this invention is to provide a display device utilizing gas discharge whose brightness is kept constant, and in which the change of firing voltage is small.

Moreover, another object of this invention is to provide a long-life display device which prevents adverse influence from sputtering without inducing an increase in the firing voltage.

A display device utilizing gas discharge of this invention is characterized in that discharge cells in panels have groups of row electrodes and groups of column electrodes insulated from the cells to provide discharge points in a matrix form. The surface of the dielectric layer covering each of the groups of electrodes is specially treated. The surface treatment permits the formation, on the surface of the dielectric layer, of a protection layer which protects the surface from sputtering, or a layer which increases secondary emissivity $\gamma$ from the surface and protection layer.

In order that the invention may be readily carried into effect, it will now be described with reference to the accompanying drawings, wherein:

FIG. 2 is a schematic diagram of a display device utilizing gas discharge of the invention;

Figure 1:
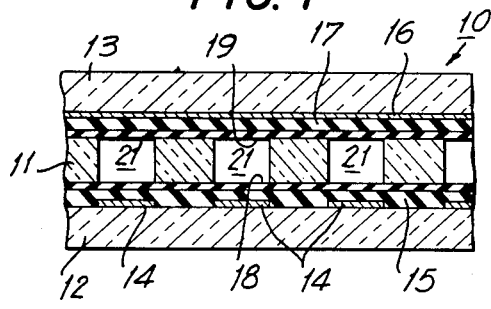

In FIG. 1, a display device 10 comprises a basic glass plate 11 with holes and glass substrates 12 and 13 placed on both surfaces or sides of the glass plate 11, as main members. A group of electrodes 14, which are transparent and whose main component is $SnO_2$, are formed on one surface of the glass substrate 12 and the upper surface of the electrodes is covered by a dielectric layer 15. The group of electrodes 14 may be arranged in rows or columns. Another group of electrodes 16, which are transparent, are formed on the surface of the other glass substrate 13, and the lower surface of the electrodes is covered by a dielectric layer 16. The groups of electrodes 16 are placed transversely to the electrodes 14 and may be arranged in columns or rows.

The material of the dielectric layers 15 and 17, as stated above, preferably comprises low melting temperature glass, because of the requirements such as suitable expansion coefficient, good thermal flow properties, facility for coating transparently, and sufficient durability at a temperature of the treatment in sealing process. The proper thickness of each dielectric layer 15 and 17 is between 30 and 50 microns.

Protection layers 18 and 19 are formed on the surface of the dielectric layers 15 and 17, respectively, in accordance with the invention and may comprise, for example, silicon dioxide ($SiO_2$). In forming the protection layers 18 and 19, the conventional vacuum evaporation method may be utilized in general, but $SiO_2$ is not easily evaporated. So, in this case, it is recommendable to change SiO into $SiO_2$ by oxidation after the evaporation of SiO. Of course, a chemical sputtering method, or any other methods may be utilized.

Figure 2:
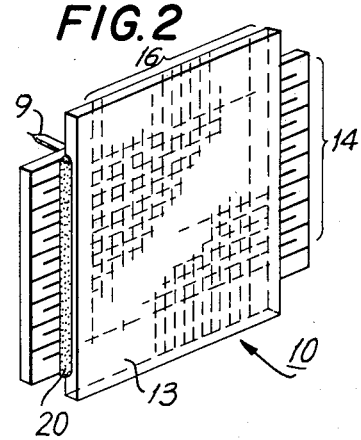
FIG. 2 is a partial cross-sectional view of an embodiment of a display device utilizing gas discharge of the present invention.

The two glass substrates 12 and 13, on which the groups of electrodes 14 and 16, the dielectric layers 15 and 17 and the protection layers 18 and 19 are formed, are positioned, as shown in FIG. 1, on both surfaces or sides of the glass substrate 11 having holes. As is more clearly shown in FIG. 2, the stacked structure is sealed around its circumference and set fast together by a sealing agent 20 of low melting temperature glass. Gas is supplied to the space occupied by the glass plate 11 having holes, which gas primarily consists of Neon (Ne) and is capable of being ionized. The gas is supplied from a Chip tube 9. Under such conditions, the group of electrodes 14, placed in rows, are situated correspondent to lateral lines of holes of the glass plate 11, and the group of electrodes 16, placed in columns, are situated correspondent to longitudinal lines, so that discharge cells 21 are provided at each cross point of both groups of electrodes.

If, in the aforedescribed display device utilizing gas discharge 10, some voltage is selectively supplied between the groups of electrodes 14 in rows and the groups of electrodes 16 in columns, the first discharge will be initiated at a time when the potential voltage distributed on the discharge cell 21 exceeds the firing voltage of said cell. Afterwards, due to the effect of a wall charge generated on the inside wall of the discharge cells, discharge continues at the sustaining voltage of alternating current which is lower than the firing voltage. Maintenance of the discharge by an application of sustaining voltage means that an information provided at first in the form of a voltage exceeding the firing voltage is stored in the cell. The storage is provided due to wall charge.

The light generated by a glow discharge can be seen from both sides, or one side of the glass substrates 12 and 13, and a desired display can be obtained by a combination of discharging spots. Such a device, in itself, is the same as that of a well-known display device utilizing gas discharge and the details thereof are disclosed in the prior art referred to above.

During operation, the inside wall of the discharge cell 21 is always exposed to ion bombardment. Such being the case, if the protection layers 18 and 19 are not utilized and if the dielectric layers 15 and 17 of low melting temperature glass directly exposed in the discharge cells, a compound of heavy metallic elements contained in said dielectric layers will be sputtered and the cells will be unavoidably darkened. In a concrete example, deterioration of the discharge cells by such sputtering causes a decrease in the quality of the display because of the darkening of the inside wall of the cells, and causes an increase in the firing voltage.

Figure 3A:
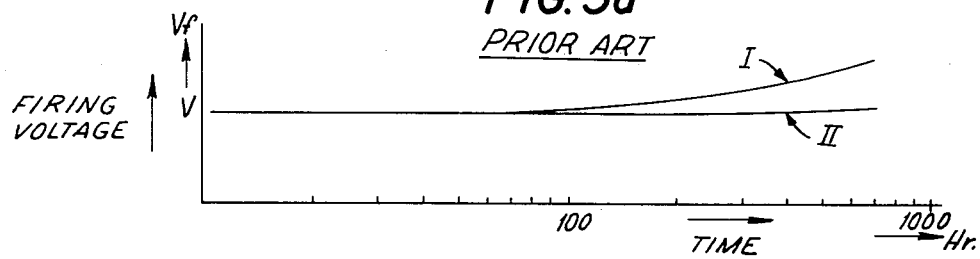
FIGS. 3a and 3b are graphical presentations showing the relation between firing voltage and time during operation.

FIG. 3a shows the increase of the firing voltage. In FIG. 3a, the abscissa represents time and the ordinate represents the firing voltage. FIG. 3a shows the relation between the time expended during operation and the firing voltage. The consecutive discharging tends to follow the curve I and the non-consecutive discharging tends to follow the curve II. The curves I and II of FIG. 3a shows that the conventional display device having no protection layers is inclined to change scores of percentage of firing voltage in proportion to time expended and that there can be some difference of characteristics of cells between high frequency firing and low frequency firing. It is, however, doubtful whether all of the causes of such inconveniences are due to sputtering in the wall of the cells. It is not wrong, however, to consider that sputtering is the biggest cause of such inconveniences.

In a principal embodiment of this invention herein before mentioned with reference to FIG. 1, the protection layers 18 and 19 of $SiO_2$ are formed as a means to prevent the walls of the cells from sputtering. Since the dielectric layers 15 and 17 of low melting temperature glass containing such a compound of heavy metallic elements may be protected from ion bombardment at the time of discharging by the protection layers 18 and 19 of $SiO_2$, and since $SiO_2$ can sputter with great difficulty, the aforedescribed defects may be removed.

Since the purpose of the protection layers 18 and 19 is to prevent the compound of heavy metallic elements which constitute the cell wall from being dispersed by ion bombardment, something which tends not to present such phenomenon and besides has an insulation characteristic sufficient to support the inside wall charge is required as the material of said protection layers. In this respect, light metallic oxide, such as, for example, $SiO_2$ to $Al_2O_3$, is suitable as the material of the protection layers. Silicon nitride and aluminum nitride may also be utilized.

Figure 3B:
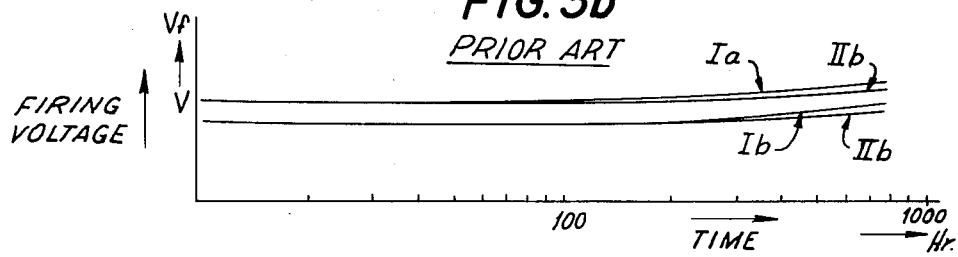

The abscissa and ordinate of FIG. 3b represent time and the firing voltage, respectively, as in FIG. 3a. The time is that which expires during operation of an improved display device utilizing gas discharge of the present invention. FIG. 3a illustrates the firing voltage characteristic of a device and FIG. 3b illustrates the firing voltage characteristic of the device of the invention. Curves Ia and IIa of FIG. 3b show the characteristic curves of consecutive parts of firing and unconsecutive parts of firing in a device in which a layer of $SiO_2$ having a thickness of 2000A is formed on the wall of the cells which are otherwise the same as the cells of FIG. 3a.

Curves Ib and IIb of FIG. 3b show the characteristic in a device in which a layer of $Al_2O_3$ having the same thickness of 2000A is formed on the wall of the cells. The curves Ib and IIb clearly show that the inclination of the firing voltage to increase due to sputtering is much improved or suppressed. Of course, a darkened spot could not be observed anywhere at the termination of this experiment.

Figure 4:
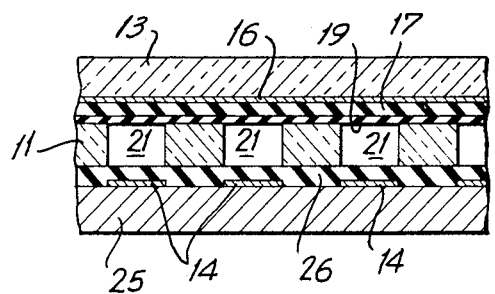
FIGS. 4, 5, 6 and 7 are partial cross-sectional views of other, different, modified embodiments of the display device of the invention.

FIG. 4 shows another embodiment of the display device of the invention having protection layers. In the embodiment of FIG. 4, one substrate 25, which supports the group of electrodes 14 positioned in rows, is of alumina. Since $Al_2O_3$ has a very high melting point, paste which has a high firing temperature but contains a small percentage of PbO can be used as the dielectric layer 26 which covers the group of electrodes 14. The paste No. 8190 made by Dupon Industry is often used for insulators between the layers of thick film integrated circuits and is best in quality.

In this case, it is difficult for sputtering of heavy metallic elements to occur from the wall 26 of cell on the side of the substrate 25, so that the protection layer 19 for preventing sputtering is formed only on the surface of the dielectric layer 17 of low melting temperature glass which covers the group of electrodes 16 supported by the glass substrate 13. In the embodiment of FIG. 4, the glow discharge light for display is visible via the transparent glass substrate 13.

The utilization of the protection layer may prevent the worst of the discharge characteristics in accordance with time expended during operation, but discharge cells utilizing protection layers sometimes have a high firing voltage as compared with types in which the wall of the cell of low melting temperature glass is directly exposed. This is considered to depend upon the magnitude of the secondary electron emissivity γ of materials which construct the inner wall of the cell. Accordingly, if the protection layer is provided with high secondary electron emissivity, sputtering has no adverse effect on the device and, furthermore, a low firing voltage of discharge cell may be obtained.

Silicon dioxide or $SiO_2$, as hereinbefore mentioned, as is easily known from its energy structure, has comparatively larger γ, so that the protection layer of $SiO_2$ functions to prevent sputtering without inducing the firing voltage to increase. An effective means for providing the protection layer with a large secondary electron emissivity γ is disclosed with reference to FIG. 5.

Figure 5:
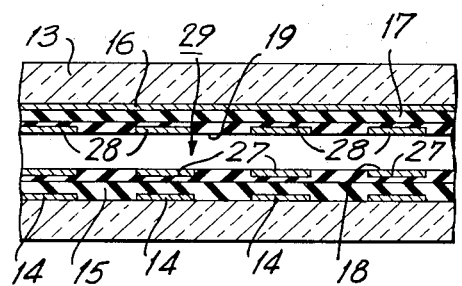

In FIG. 5, the transparent glass substrates 12 and 13, the groups of electrodes 14 and 16 formed on said glass substrates, the dielectric layers 15 and 17 forming the insulating covers of the electrodes and the protection layers 18 and 19 are all utilized in the same manner as in the embodiment of FIG. 1. The embodiment of FIG. 5 differs from that of FIG. 1, however, in that the glass plate 11 of FIG. 1 having holes is omitted in FIG. 5 and denaturalized layers 27 and 28 are added at each discharge point of the protection layers 18 and 19 respectively. The glass plate 11 with holes (FIG. 1) omitted in the embodiment of FIG. 5 is not necessary for a gas discharge display device of the type of the invention, and even if a discharge cell 29 which is filled with gas capable of being ionized is of flat space configuration as shown in FIG. 5, each opposite crossing part of the group of electrodes in rows and the group of electrodes in columns can be controlled as discharge points independent from each other. The glass plate 11 (FIG. 1) having holes thus has no significant relation to the invention.

The denaturalized layers 27 and 28 are for the purpose of increasing the secondary electron emissivity γ. In this case, the layers 27 and 28 are formed by selective injection of cesium atoms Cs to the parts corresponding to the discharge points of the protection layers 18 and 19. The following method should be taken into consideration in forming the denaturalized layers. Discharge gas including the vapor of Cs is introduced into the discharge cell 29 after evacuation, a firing voltage is applied between the group of electrodes 14 and the group of electrodes 16 to ionize the Cs molecules, and the Cs ions are bombarded to the discharge points of the protection layers 18 and 19.

Another method for forming the denaturalized layers 27 and 28 is one in which Cs is selectively adhered in advance on the surfaces of the protection layers 18 and 19 and the Cs is diffused and permeated into the protection layers by means of heat treatment. At any rate, since the denaturalized layers 27 and 28 provide a large secondary electron emissivity γ to the inside wall of the cells, they are very useful in producing a discharge cell whose firing voltage is low.

We have found that a model discharge cell having denaturalized layers 27 and 28 of Cs on the protection layers 18 and 19, respectively, of $SiO_2$ and having a gap length of 150 microns, a gas mixture of Ne + $N_2$ and a gas pressure of 400mm of mercury, starts firing at no more than only 100 volts. This is amazing compared with the fact that the firing voltage of discharge cells having no such denaturalized layers is 200 volts or thereabout.

Figure 6:
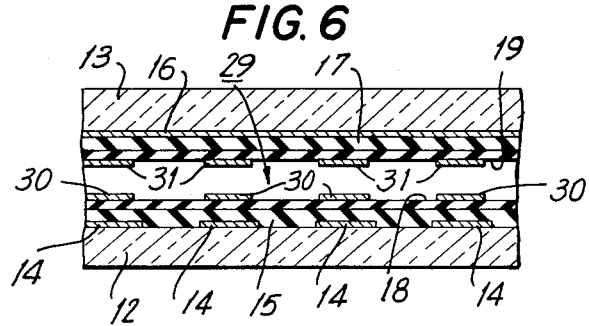

FIG. 6 shows another embodiment of the display device of the invention, in which high γ metal layers 30 and 31 are formed in electrically isolated areas at the exact discharge points on the surface of the protection layers 18 and 19. A suitable material for the metal layers 30 and 31 is nickel. The layers 30 and 31 are easily formed by a method of vacuum evaporation and photo-etching. In this case, the high γ metal layers 30 and 31 are in electrically isolated areas with neighboring layer areas insulated from each other, so that there is no danger that the generated wall charge may disappear or may be diffused. The metal layers 30 and 31 in isolated areas not only contributes to the reduction of firing voltage but also has an effect on preventing the diffusion of ions by concentrating the electric field on the corresponding discharge point, when the discharge point is addressed by applying firing voltage to both groups of electrodes.

Figure 7:
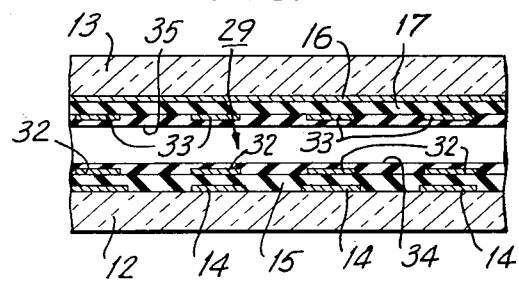

In FIG. 7 high γ metal layers 32 and 33 of nickel or the like are formed exactly at the discharge points of the dielectric layers 15 and 17, respectively. Protection layers 34 and 35 for preventing sputtering are provided for covering the surfaces of the dielectric layers 15 and 17 and the protection layers 34 and 35. In the embodiment of FIG. 7, a tunnel effect occurs in the electric field of the wall charge which appears on the surface of the protection layers 34 and 35 at the time of discharge, and then gives rise to an effect of ionizing gas by drawing electrons in the discharge cell. In this case, it is needless to say that sputtering of the compound of heavy metallic elements is prevented by the protection layers 34 and 35.

As hereinbefore mentioned, an object of the invention is to provide a long life gas discharge display device, in which the electrodes are insulated from the discharge cells, by preventing deterioration of the discharge cells. Moreover, the device of the invention is a display device having the characteristics that the brightness for display is constant and is also stable for a long time, because darkening of the walls of the cells does not occur. These advantages are gained without permitting the firing voltage to go up, which makes the invention much more useful.

While the invention has been described by means of specific examples and in specific embodiments, we do not wish to be limited thereto, for obvious modifications will occur to those skilled in the art without departing from the spirit and scope of the invention.

We claim:

1. A display device utilizing gas discharge, said display device comprising a pair of insulating substrates spaced from each other and in substantially parallel relation, each of said substrates having an inside surface facing that of the other and at least one of said substrates being transparent; a first group of electrodes positioned in rows on the inside surface of one of the substrates; a second group of electrodes positioned in columns on the inside surface of the other of the substrates, the first and second groups of electrodes being positioned transverse relative to each other; a first dielectric layer covering the first group of electrodes and a second dielectric layer covering the second group of electrodes; said first and second dielectric layers being of a material having heavy metallic elements therein; and a first protection layer formed on the first dielectric layer and a second protection layer formed on the second dielectric layer for preventing sputtering, said insulating substrates being positioned relative to each other in a manner whereby they are oppositely placed with a discharge gap between them, said discharge gap being filled with gas capable of ionization and each cross point of an electrode of the first group of electrodes and an electrode of the second group of electrodes being a discharge point for display.

2. A display device as claimed in claim 1, wherein each of the protection layers comprises silicon dioxide.

3. A display device as claimed in claim 1, wherein one of the substrates comprises alumina and a protection layer is formed only on the dielectric layer of the other of the substrates.

4. A display device utilizing gas discharge, said display device comprising a pair of insulating substrates spaced from each other and in substantially parallel relation, each of said substrates having an inside surface facing that of the other and at least one of said substrates being transparent; a first group of electrodes positioned in rows on the inside surface of one of the substrates; a second group of electrodes positioned in columns on the inside surface of the other of the substrates, the first and second groups of electrodes being positioned transverse relative to each other; a first dielectric layer covering the first group of electrodes and a second dielectric layer covering the second group of electrodes; a first protection layer formed on the first dielectric layer and a second protection layer formed on the second dielectric layer for preventing sputtering; and a first layer for increasing secondary electron emissivity formed on the first protection layer and a second layer for increasing secondary electron emissivity formed on the second protection layer, said insulating substrates being positioned relative to each other in a manner whereby they are oppositely placed with a discharge gap between them, said discharge gap being filled with gas capable of ionization and each cross point of an electrode of the first group of electrodes and an electrode of the second group of electrodes being a discharge point for display.

5. A display device utilizing gas discharge, said display device comprising a pair of insulating substrates spaced from each other and in substantially parallel relation, each of said substrates having an inside surface facing that of the other and at least one of said substrates being transparent; a first group of electrodes positioned in rows on the inside surface of one of the substrates; a second group of electrodes positioned in columns on the inside surface of the other of the substrates, the first and second groups of electrodes being positioned transverse relative to each other; a first dielectric layer covering the first group of electrodes and a second dielectric layer covering the second group of electrodes; a first protection layer formed on the first dielectric layer and a second protection layer formed on the second dielectric layer for preventing sputtering; and a first denaturalized layer of cesium of high $\gamma$ emissivity formed by ion injection on the first protection layer and a second denaturalized layer of cesium of high $\gamma$ emissivity formed by ion injection on the second protection layer, said insulating substrates being positioned relative to each other in a manner whereby they are oppositely placed with a discharge gap between them, said discharge gap being filled with gas capable of ionization and each cross point of an electrode of the first group of electrodes being a discharge point for display.

6. A display device utilizing gas discharge, said display device comprising a pair of insulating substrates spaced from each other and in substantially parallel relation, each of said substrates having an inside surface facing that of the other and at least one of said substrates being transparent; a first group of electrodes positioned in rows on the inside surface of one of the substrates; a second group of electrodes positioned in columns on the inside surface of the other of the substrates, the first and second groups of electrodes being positioned transverse relative to each other; a first dielectric layer covering the first group of electrodes and a second dielectric layer covering the second group of electrodes; a first protection layer formed on the first dielectric layer and a second protection layer formed on the second dielectric layer for preventing sputtering; said insulating substrates being positioned relative to each other in a manner whereby they are oppositely placed with a discharge gap between them, said discharge gap being filled with gas capable of ionization and each cross point of an electrode of the first group of electrodes being a discharge point for display; and a first metal layer of high $\gamma$ emissivity formed on electrically isolated areas at the exact discharge points of the first protection layer and a second metal layer of high $\gamma$ emissivity formed on electrically isolated areas at the exact discharge points of the second protection layer.

7. A display device utilizing gas discharge, said display device comprising a pair of insulating substrates spaced from each other and in substantially parallel relation, each of said substrates having an inside surface facing that of the other and at least one of said substrates being transparent; a first group of electrodes positioned in rows on the inside surface of one of the substrates; a second group of electrodes positioned in columns on the inside surface of the other of the substrates, the first and second groups of electrodes being positioned transverse relative to each other; a first dielectric layer covering the first group of electrodes and a second dielectric layer covering the second group of electrodes; a first protection layer formed on the first dielectric layer and a second protection layer formed on the second dielectric layer for preventing sputtering, said insulating substrates being positioned relative to each other in a manner whereby they are oppositely placed with a discharge gap between them, said discharge gap being filled with gas capable of ionization and each cross point of an electrode of the first group of electrodes and an electrode of the second group of electrodes being a discharge point for display; and a first metal layer of high $\gamma$ emissivity formed in electrically isolated areas at the exact discharge points of first protection layer between the first dielectric layer and the first protection layer and a second metal layer of high $\gamma$ emissivity formed in electrically isolated areas at the exact discharge points of the second protection layer between the second dielectric layer and the second protection layer.

* * * * *